(12) United States Patent
Lepperhoff et al.

(10) Patent No.: US 6,185,930 B1
(45) Date of Patent: Feb. 13, 2001

(54) METHOD FOR REDUCING POLLUTANT EMISSION IN MOTOR VEHICLES

(75) Inventors: Gerhard Lepperhoff, Stolberg; Hartmut Lüders; Kirsten Hentschel, both of Aachen; Bernhard Lüers, Stolberg, all of (DE)

(73) Assignee: FEV Motorentechnik GmbH, Aachen (DE)

(*) Notice: Under 35 U.S.C. 154(b), the term of this patent shall be extended for 0 days.

(21) Appl. No.: 09/288,644

(22) Filed: Apr. 9, 1999

(30) Foreign Application Priority Data

Apr. 9, 1998 (DE) .............................................. 198 15 987
Jun. 16, 1998 (DE) .............................................. 198 26 831

(51) Int. Cl.⁷ ...................................................... F01N 3/00
(52) U.S. Cl. ............................................. 60/274; 60/285
(58) Field of Search ........................... 60/274–278, 285; 423/239, 212, 235, 236; 431/4

(56) References Cited

U.S. PATENT DOCUMENTS

| | | | |
|---|---|---|---|
| 4,473,536 | * | 9/1984 | Carberg et al. ...................... 423/239 |
| 4,916,898 | * | 4/1990 | Gandhi et al. .......................... 60/274 |
| 5,224,346 | * | 7/1993 | Berriman et al. ...................... 60/274 |
| 5,441,401 | * | 8/1995 | Yamaguro et al. ..................... 431/4 |
| 6,063,348 | * | 5/2000 | Hinke et al. .......................... 423/235 |

\* cited by examiner

*Primary Examiner*—Tu Ba Hoang
(74) *Attorney, Agent, or Firm*—Venable; Gabor J. Kelemen

(57) ABSTRACT

A method of reducing pollutants in an exhaust gas of an internal-combustion engine includes the following steps: producing, at a first location, a reactive gas component $NO_2$ from at least one part of the NO content of the exhaust gas by reaction with the oxygen, contained in the exhaust gas, under an energy effect; and reactively converting the $NO_2$ in a pollutant retaining system situated at a second location downstream of the first location as viewed in the flow direction.

6 Claims, 3 Drawing Sheets

METHOD FOR REDUCING POLLUTANT EMISSION IN MOTOR VEHICLES

CROSS REFERENCE TO RELATED APPLICATION

This application claims the priority of German Application Nos. 198 15 987.0 filed Apr. 9, 1998 and 198 26 831.9 filed Jun. 16, 1998, which are incorporated herein by reference.

FIELD OF THE INVENTION

The invention relates to a method for reducing nitrogen oxide (NO) and particulates in the exhaust gas of an internal-combustion engine.

TECHNOLOGY REVIEW

One of the most important problems to be solved in the development of engines is the reduction of pollutant emissions in motor vehicle engines. Primarily, this concerns the reduction in nitrogen oxide emissions. Engine-related measures alone are not sufficient to meet the high requirements, for example using lean-mix fuels in direct-injection gasoline engines which, like diesel engines, contain a high proportion of $O_2$ in the exhaust gas. Additional measures for a secondary treatment of the exhaust gas are required to achieve the necessary reduction in pollutant emissions. Diesel engines also require a reduction in particulate exhaust gas components.

Apart from the carbamide-SCR-method, for which an additional reagent on a carbamide base is added to the exhaust gas to improve the subsequent catalytic exhaust gas treatment, the only option available at present is the use of a $NO_x$ storage or adsorption catalyst to reduce the nitrogen oxide emissions. With current $NO_x$ storage catalysts, the NO present in the engine exhaust gas is initially oxidized to higher valency $NO_2$ by means of a precious metal component in the catalyst. The advantage of $NO_2$, as compared to NO, is that it is adsorbed more efficiently and at distinctly lower temperatures by the adsorbing agents in the storage or adsorption catalyst. For example, the adsorption of $NO_2$ on barium oxide (BaO) or barium carbonate ($BaCO_3$) as adsorbing agents occurs at room temperature.

It is, however, a disadvantage of the above-outlined system that an extremely low-sulfur fuel, with less than 10 ppm weight, must be used. This is because the storage or adsorption catalyst will fail if a sulfur-containing fuel is used. As a result of platinum oxidation, $SO_3$ is formed from the $SO_2$ in the exhaust gas, so that stable barium sulfate is formed in the adsorption catalyst in place of the barium nitrate and the adsorption of $NO_2$ is either obstructed or cannot take place at all. Although the alkaline metals or alkaline earth metals used in the adsorption catalyst represent excellent $NO_x$ adsorbing agents, they also exhibit a high tendency to form stable sulfates. That is the reason why the adsorbing agents are "poisoned" by the sulfur contained in the fuel and their capacity to adsorb is reduced unless this is counteracted by corresponding desulfatizing measures. Desulfatizing, meaning a thermal decomposition of the sulfates, is in principle possible in a reducing atmosphere with simultaneous high temperature. With the presently available $NO_x$ storage catalysts, the storage of nitrogen oxides contained in oxygen-rich exhaust gases is also possible in principle and with a high degree of effectiveness for a large temperature range. However, there is a problem of fast aging of the catalyst as a result of the above-described sulfur poisoning of the $NO_x$ adsorption material.

The deposition of particulate exhaust-gas components on filtering material does not present a problem, per se. Most known filtering materials accept high degrees of deposit of such materials. This leads however, to the problem of filter regeneration, which has not yet been solved satisfactorily. Filter regeneration during engine operation can be achieved with the aid of metal containing fuel additives, e.g. cerium, iron, copper or manganese, or by burning off of particulates by ignition with a heating wire. The disadvantages of these solutions are the additional emissions of these additives which, over the long term, not only can result in clogging the filter, but also represent an additional environmental threat as secondary emission. There can also be potential problems associated with the use of special ignition devices for the heating wire.

Particle emission for diesel fuels essentially consists of carbon black, or amorphous carbon. Carbon black can be oxidized, as is known, by means of reactive fuel components such as nitrogen dioxide ($NO_2$), elementary oxygen ($O^*$), ozone ($O_3$), as well as OH. Attempts have been made to partially oxidize the nitrogen oxide (NO), which is found in large amounts in the engine exhaust gas, to higher valency $NO_2$ by means of an oxidation catalyst with high platinum content, which is installed in front of the particle filter. This generally advantageous method, which does not require any secondary energy or any control/regulating unit, can be used successfully only if an extremely low-sulfur diesel fuel is used.

This system "fails" when using sulfur-containing fuels, such as are normally used nowadays, since the resulting $SO_2$ blocks the catalytically active areas of the catalyst, so that $SO_3$ is generated, but not the $NO_2$ necessary for the regeneration of the particle filter. This is because the selectivity of platinum catalysts is more than twice as high for $SO_2$ oxidation than for NO oxidation. Thus, a different method must be found for filter regeneration with the aid of $NO_2$ when using sulfur-containing fuels.

SUMMARY OF THE INVENTION

It is an object of the invention to provide an improved method which is used for removing nitrogen from lean exhaust gases by means of a storage catalyst and for regenerating the particle filter and which remains continuously operational even in case of sulfur-containing fuels.

This object and others to become apparent as the specification progresses, are accomplished by the invention, according to which, briefly stated, the method of reducing pollutants in an exhaust gas of an internal-combustion engine includes the following steps: producing, at a first location, a reactive gas component $NO_2$ from at least one part of the NO content of the exhaust gas by reaction with the oxygen, contained in the exhaust gas, under an energy effect; and reactively converting the $NO_2$ in a pollutant retaining system situated at a second location downstream of the first location as viewed in the flow direction.

The invention may be used with a piston-type internal-combustion engine which runs on hydrocarbon-based fuel.

According to a preferred embodiment of the invention, energy affects the NO in the exhaust gas via a non-thermal plasma, by means of which reactive gas components such as $O^*$, $O_3$ and OH are formed simultaneously.

DETAILED DISCRIPTION OF THE INVENTION

Figure 1:
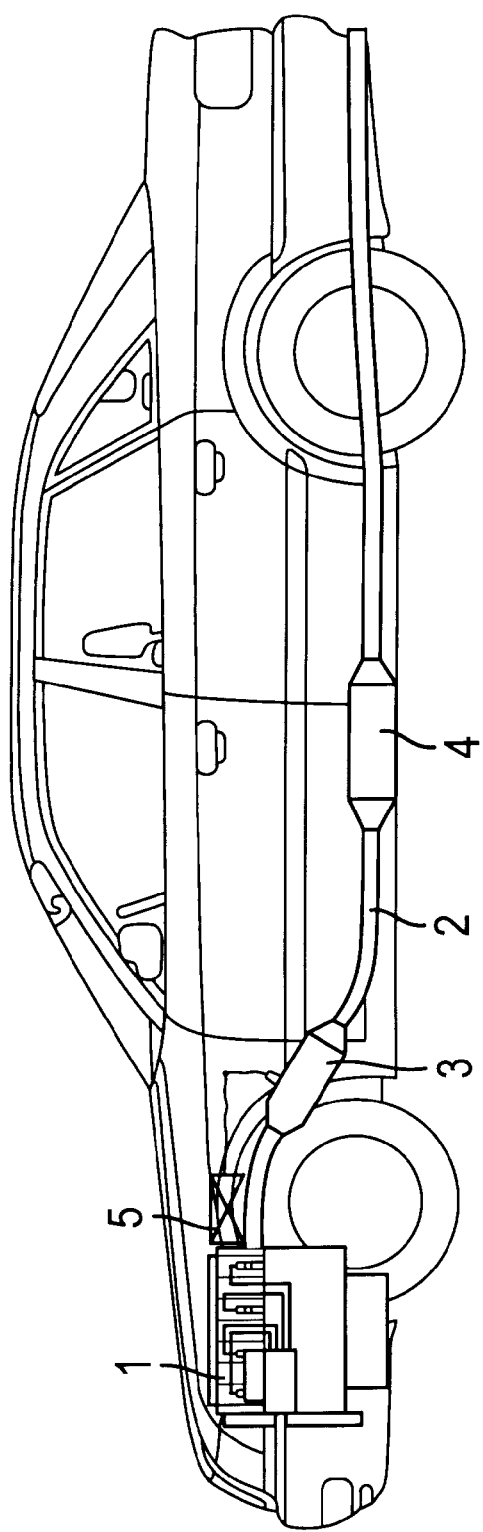
FIG. 1 is a schematic side elevational view of a motor vehicle with particle filter as pollutant retaining system.

The method disclosed by the current invention does not require an oxidation catalyst with high platinum content, so that sulfatizing problems do not arise and sulfur-containing fuels accordingly can be used for the engine operation. Rather, the invention involves the effect of energy, such as non-thermal plasma, in connection with oxygen, to reduce pollutant emissions. Non-thermal plasma, such as a "barrier discharge", is based on the principle of a silent, dielectrically obstructed discharge. With barrier discharge, electrical discharges normally burn between two flat electrodes, which can be planar or cylindrical, and which are supplied with an alternating current in the kilohertz (kHz) range. At least one of the two electrodes has a dielectric coating. The dielectric coating, by virtue of the substantial a.c. resistance of the dielectric due to the used frequencies, limits the transport and consumption of the supplied electrical energy in the plasma. During operation, the dielectric initially is charged-up statically in a half-wave. The resulting electrical field in the plasma space subsequently leads to the spontaneous ignition of plasma, which is fed from the surface charge of the dielectric in the range of several $mm^2$ of surface. Due to the strongly localized effect, the plasma discharge takes the form of a thin thread, which dies down several milliseconds after the surface discharge is used up. Macroscopically, a silent discharge is represented as a plurality of such plasma threads, which are generated anew in each half-wave of the exciting voltage. This plasma is distinguished in that it is practically pressure-independent; that is, it burns off in the above-described manner at normal as well as excess pressure. The plasma is very dense: the plasma density in the threads generally lies in the range of $10^{15}$ electrons per $cm^3$. A progressive destruction of the surfaces delimiting the plasma is avoided through the extremely short burning time for the individual plasma threads. As alternative embodiments to the above-described barrier discharge, a non-thermal plasma can also be formed by a "corona discharge" or in the form of "surface plasmas".

The exhaust gas, which is guided through a region acted upon by energy in a plasma reactor, is "bombarded" with electrons as a result of the discharge. This leads to a reaction of several components in the exhaust gases. Thus, $NO+O$ react to form $NO_2+e^-$. The atomic oxygen needed for this reaction is obtained from the oxygen ($O_2$) in the exhaust gas. However, $O_3$ and OH are also generated as a result of various reactions of other exhaust gas components in the barrier discharge region and are also available as oxidation means. By means of these reactions, it is possible to oxidize the NO, preponderantly present in the exhaust gas, to higher valency $NO_2$ which is then reacted in the downstream pollutant retaining systems.

The term pollutant retaining system within the meaning of this invention comprises a $NO_x$ adsorption catalyst as well as a particle filter.

In accordance with the invention, when using a particle filter as a pollutant retaining system, the generated $NO_2$ is thus used for the oxidation of the retained carbon black particles. The thereby occurring reaction is $C+2 NO_2 \rightarrow CO_2+2$ NO. As a result of the other reactive components, an oxidation of carbon also takes place based on $O^*+C\rightarrow CO$, $O_3+C\rightarrow CO+O_2$, $2OH+C\rightarrow CO+H_2O$. This reaction sequence can occur continuously or discontinuously, depending on the filtering method. In a preferred embodiment, the carbon black covering of the particle filter is detected via a counterpressure measurement in the exhaust gas system and the plasma reactor is activated if a predetermined pressure is exceeded and is deactivated following burning off of the carbon black. Since a diesel engine can be adjusted and operated in such a way that little NO is generated and since only a small amount of $NO_2$ is needed for burning off the carbon black, the small amount of NO accumulating behind the particle filter can be discharged untreated with the exhaust gas.

According to the invention, when using a $NO_x$ adsorption catalyst as pollutant retaining system, the generated $NO_2$ is stored and subsequently converted to $N_2$ in a regeneration phase through reduction reactions with reductive exhaust gas components.

When the adsorption catalyst contains the adsorbing agents BaO and $BaCO_3$, the following reactions take place for the storage operation, which lead to the storage of nitrogen oxide.

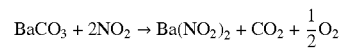

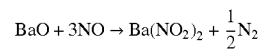

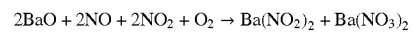

In order to regenerate the $NO_x$ adsorption or storage catalyst, the exhaust gas must contain reducing components such as carbon monoxide (CO), hydrogen ($H_2$) and hydrocarbons ($C_xH_y$) which reduce the nitrogen components at the adsorbing agents via a corresponding chemical reaction, so that essentially only nitrogen ($N_2$), carbon dioxide ($CO_2$) and water ($H_2O$) are released with the exhaust gas.

The method according to the invention can then be used in stages if carbon black and a high proportion of NO are present in the exhaust gas. In that case, one "$NO_2$ generator" should be connected before the particle filter and one before the adsorption catalyst system. The "$NO_2$ generator" may be in the form of a so-called plasma reactor, to generate the required amount of $NO_2$ which is needed for the reactive conversions in the downstream-connected pollutant retaining system.

In the description which follows, preferred embodiments will be set forth with reference to the Figures.

Turning to FIG. 1, a plasma reactor 3 with downstream connected particle filter 4 is arranged in the exhaust gas pipe 2 of a piston-type internal combustion engine 1 of a motor vehicle. A control device 5 may be coordinated with the plasma reactor 3 which periodically activates the plasma reactor 3, so that the deposits of carbon black on the particle filter 4 can be burnt off at required time intervals. The activation can occur, for example, in response to a counterpressure measurement at the particle filter 4. As soon as a predetermined pressure level is exceeded in front of the particle filter 4, indicating that the particle filter is covered, the plasma reactor 3 is activated and the burn-off reaction is initiated. The deactivation can be pressure-dependent or time-dependent. In this way, the electrical energy which is required by the plasma reactor and which must be supplied by the vehicle on-board electrical system, is made available only as needed.

Figure 2:
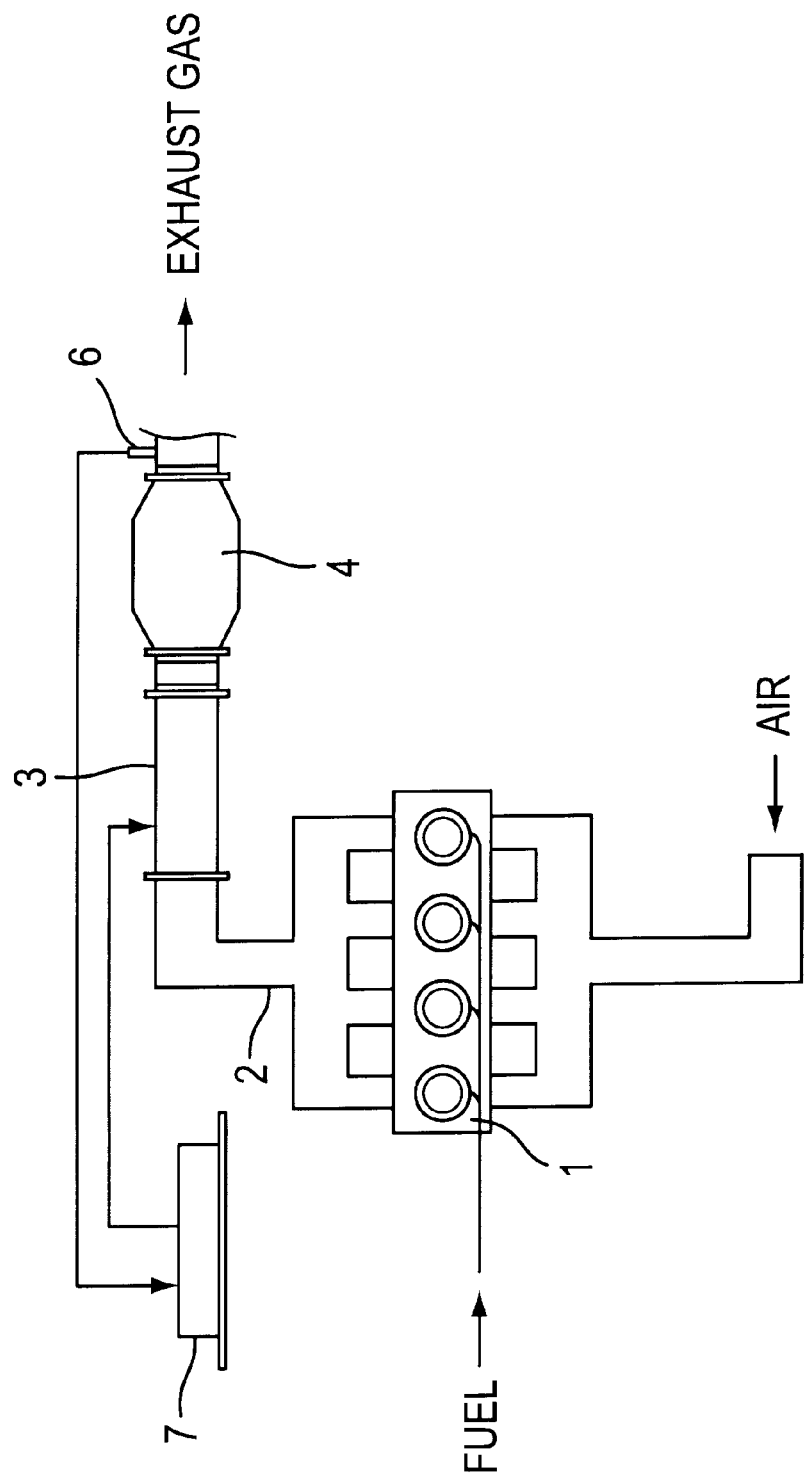
FIG. 2 is a diagram of a piston-type internal combustion engine with an adsorption catalyst.

Turning to FIG. 2, a plasma reactor 3 which is fed by the on-board electrical system with electrical energy, is arranged in the exhaust gas pipe 2 of the piston-type internal-combustion engine 1. As a result of the effect of the non-thermal plasma on the exhaust gases conducted through the plasma reactor 3, the exhaust gas is enriched with $NO_2$ in the region behind the plasma reactor. A $NO_x$ adsorption catalyst is provided with this arrangement as a pollutant retaining system 4.

Expediently, a $NO/NO_2$ sensor 6 is provided which is arranged behind the $NO_x$ adsorption catalyst and which is connected to a control device 7, so that the plasma reactor 3 can be activated depending on the NO or $NO_2$ component detected behind the $NO_x$ adsorption catalyst.

Figure 3:
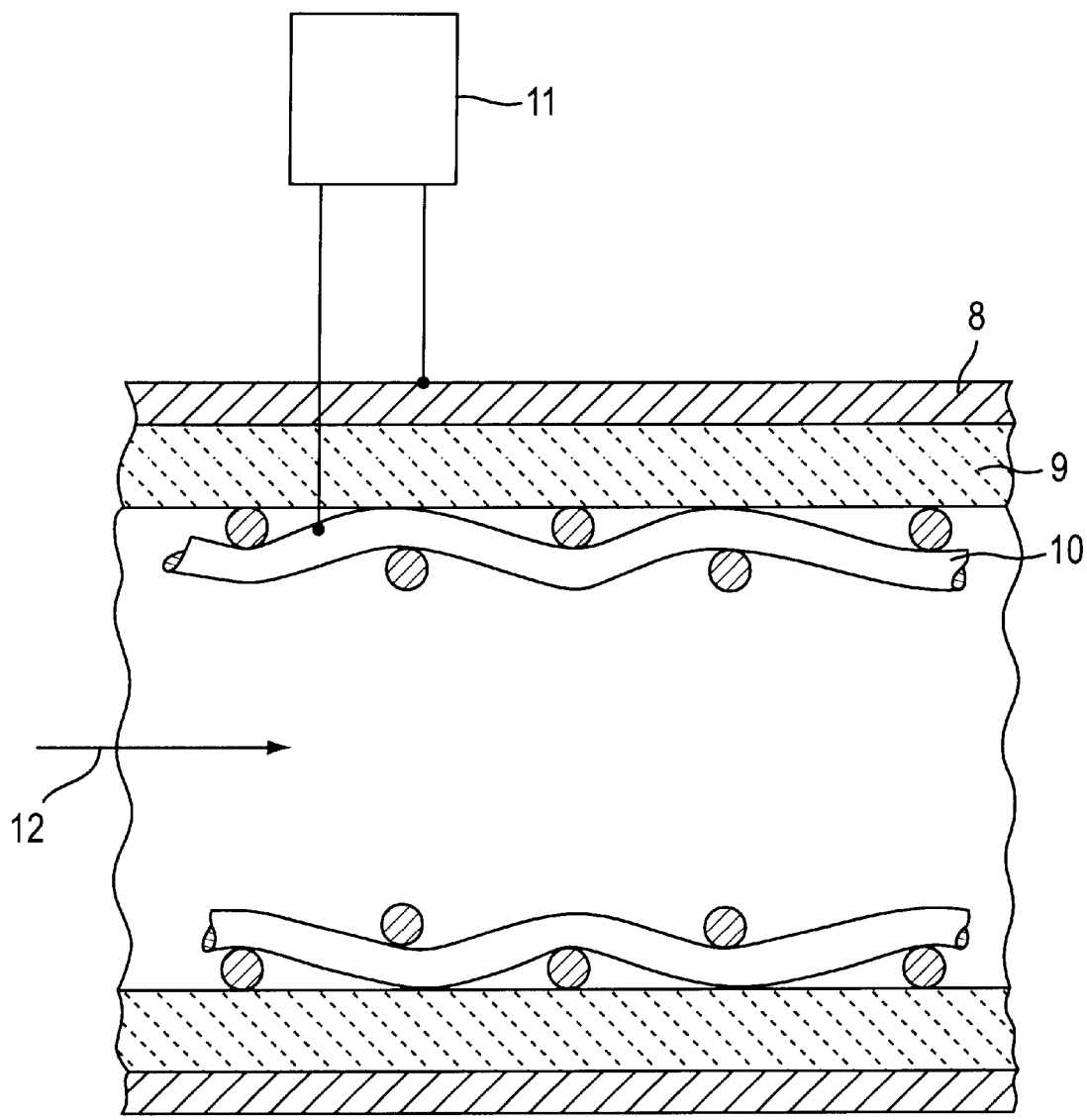
FIG. 3 is a fragmentary sectional view of a plasma reactor for practicing the invention.

FIG. 3 illustrates the operational principle of the plasma reactor. Essentially, the reactor includes a tubular first electrode 8 internally coated with a closed, dielectric barrier 9 made, for example, of ceramic. A wire grid arranged on the inside surface of the dielectric barrier 9 forms the counter electrode 10. The electrode 8 and the electrode 10 are connected to an alternating voltage source 11.

The exhaust gas to be treated flows through the plasma reactor 3 in the direction of arrow 12. If an alternating voltage in the kilohertz range is applied to the two electrodes 8 and 10, closely side-by-side disposed thread-like gas discharges (forming a non-thermal plasma) are generated in the gap region between the electrode 10 and the dielectric barrier 9. The exhaust gas flowing by is caused to swirl in the region of electrode 10 and arrives in such a condition in the region of the plasma threads, so that the energy effect on the nitrogen oxide (NO) results, in the presence of oxygen in the exhaust gas, in the formation of nitrogen dioxide ($NO_2$) which is then removed along with the exhaust gas and is deposited and stored on the adsorbing agents in the adsorption catalyst 4 (FIG. 2).

It will be understood that the above description of the present invention is susceptible to various modifications, changes and adaptations, and the same are intended to be comprehended within the meaning and range of equivalents of the appended claims.

What is claimed is:

1. A method of reducing pollutants in an exhaust gas of an internal-combustion engine, wherein the exhaust gas has a flow direction and contains NO and oxygen; comprising the following steps:
    (a) producing, at a first location, a reactive gas component $NO_2$ from at least one part of the NO content by reaction with the oxygen under an energy effect; and
    (b) reactively converting the $NO_2$ in a pollutant retaining system situated at a second location downstream of said first location as viewed in said flow direction.

2. The method as defined in claim 1, wherein step (a) comprises the step of producing reactive gas components elementary oxygen, $O_3$ and OH and step (b) comprises the step of reactively converting the elementary oxygen, $O_3$ and OH in said pollutant retaining system.

3. The method as defined in claim 2, wherein said pollutant retaining system includes a nitrogen oxide adsorption catalyst; further comprising the step of storing the $NO_2$ in said nitrogen oxide adsorption catalyst and converting the $NO_2$ to $N_2$ in a subsequent regeneration phase by a reduction reaction with the reactive gas components.

4. The method as defined in claim 2, further comprising the step of generating a non-thermal plasma for producing an energy effect on at least one of exhaust gas components NO, $O_2$ and HC.

5. The method as defined in claim 2, wherein said pollutant retaining system includes a particle filter; further comprising the step of retaining carbon black particles from the exhaust gas by said particle filter; and further wherein step (b) comprises the step of oxidizing said carbon black by said reactive gas components.

6. The method as defined in claim 5, wherein said pollutant retaining system includes a nitrogen oxide adsorption catalyst; further comprising the step of storing the $NO_2$ in said nitrogen oxide adsorption catalyst and converting the $NO_2$ to $N_2$ in a subsequent regeneration phase by a reduction reaction with the reactive gas components.

* * * * *